United States Patent
Chinchwadkar et al.

(10) Patent No.: US 7,747,610 B2
(45) Date of Patent: Jun. 29, 2010

(54) DATABASE SYSTEM AND METHODOLOGY FOR PROCESSING PATH BASED QUERIES

(75) Inventors: Gajanan S. Chinchwadkar, Fremont, CA (US); Zhang Wei, Shanghai (CN); Xiong Zhiping, Shanghai (CN)

(73) Assignee: Sybase, Inc., Dublin, CA (US)

( * ) Notice: Subject to any disclaimer, the term of this patent is extended or adjusted under 35 U.S.C. 154(b) by 428 days.

(21) Appl. No.: 11/751,008

(22) Filed: May 19, 2007

(65) Prior Publication Data

US 2008/0114803 A1    May 15, 2008

Related U.S. Application Data

(60) Provisional application No. 60/767,595, filed on Nov. 10, 2006.

(51) Int. Cl.
*G06F 7/00* (2006.01)

(52) U.S. Cl. .................................. 707/716; 707/717

(58) Field of Classification Search .................. None
See application file for complete search history.

(56) References Cited

U.S. PATENT DOCUMENTS

| | | | |
|---|---|---|---|
| 6,240,407 B1 | 5/2001 | Chang et al. |
| 6,356,906 B1 | 3/2002 | Lippert et al. |
| 6,397,219 B2 | 5/2002 | Mills |
| 6,466,940 B1 | 10/2002 | Mills |
| 6,480,860 B1 | 11/2002 | Monday |
| 6,510,434 B1 | 1/2003 | Anderson et al. |
| 6,549,922 B1 | 4/2003 | Srivastava et al. |
| 6,587,855 B1 | 7/2003 | Ellmann et al. |
| 6,604,100 B1 | 8/2003 | Fernandez et al. |
| 6,622,144 B1 | 9/2003 | Rush |
| 6,631,379 B2 | 10/2003 | Cox |
| 6,631,519 B1 | 10/2003 | Nicholson et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,721,727 B2 | 4/2004 | Chau et al. |
| 6,799,184 B2 | 9/2004 | Bhatt et al. |
| 6,804,677 B2 | 10/2004 | Shadmon et al. |
| 6,910,040 B2 | 6/2005 | Emmick et al. |
| 6,912,538 B2 | 6/2005 | Stapel et al. |
| 7,139,746 B2 | 11/2006 | Shin et al. |
| 7,260,572 B2 | 8/2007 | Min et al. |
| 7,263,525 B2 | 8/2007 | Shin |
| 7,386,568 B2 | 6/2008 | Warner et al. |
| 7,523,131 B2 | 4/2009 | Warner et al. |
| 7,533,111 B2 | 5/2009 | McCollum |

(Continued)

*Primary Examiner*—Tim T. Vo
*Assistant Examiner*—Aaron Sanders
(74) *Attorney, Agent, or Firm*—John A. Smart; G. Mack Riddle

(57) ABSTRACT

A system and methodology for processing of path based queries is described. In one embodiment, a method for processing a path based query requesting data from a markup language document comprises steps of: parsing the path based query requesting data to generate a query tree corresponding to the path based query; identifying all paths which may be utilized for obtaining data requested by the path based query from the markup language document; creating a transformed query tree to represent all identified paths; generating a query plan for obtaining data requested by the path based query based on the transformed query tree; and executing the query plan to obtain and return the data requested by the path based query.

35 Claims, 10 Drawing Sheets

U.S. PATENT DOCUMENTS

| | | |
|---|---|---|
| 2003/0212662 A1 | 11/2003 | Shin et al. |
| 2004/0220927 A1 | 11/2004 | Murthy et al. |
| 2005/0038785 A1* | 2/2005 | Agrawal et al. ............... 707/6 |
| 2005/0044113 A1 | 2/2005 | Manikutty et al. |
| 2006/0005122 A1 | 1/2006 | Lemoine |
| 2007/0156750 A1 | 7/2007 | Calahan |
| 2007/0250471 A1 | 10/2007 | Fontoura et al. |
| 2007/0299834 A1* | 12/2007 | Liu et al. ...................... 707/4 |
| 2008/0091623 A1 | 4/2008 | Idicula et al. |
| 2008/0222087 A1* | 9/2008 | Balmin et al. ................. 707/2 |

* cited by examiner

DATABASE SYSTEM AND METHODOLOGY FOR PROCESSING PATH BASED QUERIES

CROSS REFERENCE TO RELATED APPLICATIONS

The present application is related to and claims the benefit of priority of the following commonly-owned, presently-pending provisional application(s): application Ser. No. 60/767,595, filed Nov. 10, 2006, entitled "Database System With Path Based Query Engine", of which the present application is a non-provisional application thereof. The present application is related to the following commonly-owned, presently-pending application(s): application Ser. No. 10/904,055, filed Oct. 21, 2004, entitled "Database System Providing Methodology for Execution of Functions in XML Queries". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 78068 Bytes, created: Nov. 7, 2006 1:25:18 PM; Object ID: File No. 1; Object Contents: Source code.

BACKGROUND OF INVENTION

1. Field of the Invention

The present invention relates generally to data processing environments and, more particularly, to a database system with a path based query engine providing methodology for path based query processing.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

In recent years, applications running on database systems frequently provide for business-to-business or business-to-consumer interaction via the Internet between the organization hosting the application and its business partners and customers. Today, many organizations receive and transmit considerable quantities of information to business partners and customers through the Internet. A considerable portion of the information received or exchanged is in Extensible Markup Language or "XML" format. XML is a pared-down version of SGML (Standard Generalized Markup Language), designed especially for Web documents, which allows designers to create their own customized tags, enabling the definition, transmission, validation, and interpretation of data between applications and between organizations. For further description of XML, see e.g., "Extensible Markup Language (XML) 1.0" (Second Edition, Oct. 6, 2000) a recommended specification from the W3C, the disclosure of which is hereby incorporated by reference. A copy of this specification is available via the Internet (e.g., currently at www.w3.org/TR/2000/REC-xml-20001006). Many organizations utilize XML to exchange data with other remote users over the Internet.

Given the increasing use of XML in recent years, many organizations now have considerable quantities of data in XML format, including Web documents, newspaper articles, product catalogs, purchase orders, invoices, and product plans. As a result, these organizations need to be able to efficiently store, maintain, and use this XML information in an efficient manner. However, this XML data is not in a format that can be easily stored and searched in current database systems. Most XML data is sent and stored in plain text format. This data is not formatted in tables and rows like information stored in a relational DBMS. To search this semi-structured data, users typically utilize keyword searches similar to those utilized by many current Internet search engines. These keyword searches are resource-intensive and are not as efficient as relational DBMS searches of structured data.

Organizations with data in XML format also typically have other enterprise data stored in a structured format in database management systems. Increasingly, database system users are demanding that database systems provide the ability to access and use both structured data stored in these databases as well as XML and other unstructured or semi-structured data. In addition, users desire flexible tools and facilities for performing searches of this data.

One of the key roles of a database management system (DBMS) is to retrieve data stored in a database based on specified selection criterion. This typically involves retrieving data in response to a query that is specified in a query language. One particular need is for a solution that will enable efficient searches of information in XML documents. For instance, it would be desirable to have a XML version of SQL (Structured Query Language) that would enable a user to easily retrieve all nodes of type X that have descendants of type Y from a XML document.

One current solution used in XML-based applications to query the contents of a XML document is the XPath query language. XPath is commonly used in Extensible Stylesheet Language Transformations (XSLT) to locate and to apply XSLT templates to specific nodes in a XML document. XPath queries are also commonly used to locate and to process nodes in a XML document that match a specified criteria. XPath provides basic facilities for manipulation of strings, numbers and booleans. It uses a compact, non-XML syntax to facilitate use of XPath within URIs and XML attribute values. XPath operates on the abstract, logical structure of a XML document, rather than its surface syntax. XPath gets its name from its use of a path notation as in URLs for navigating through the hierarchical structure of a XML document. For further description of XPath, see e.g., "XML Path Language (XPath) Version 1.0" (Nov. 16, 1999), a recommended specification from the W3C, the disclosure of which is hereby incorporated by reference. A copy of this specification is available via the Internet (e.g., currently at www.w3c.org/TR/xpath).

Although XPath provides a mechanism for locating nodes in a XML document that match specified criteria, problems remain in the processing of queries written in the XPath query language in current systems. One problem is in generating correct and efficient query plans from XPath expressions. In SQL query processing in current database systems, normalization and preprocessing components or layers are typically used to perform important tasks of semantic validation and tree transformations of SQL queries. In SQL query processing, these layers typically process a raw query tree and transform it into a correct and efficient tree structure for input into the optimizer/code generator of the database system. The optimizer/code generator can then translate this tree structure into more efficient query plans. Existing XPath query engines currently lack these normalization and preprocessing components which can result in incorrect processing of some queries and/or extremely large query plans in some instances.

XPath query parsers of current XPath query solutions generally construct trees assuming that the basic component of the tree is an element or attribute. However, XML storage and access in such systems is based on distinct paths in a XML document under consideration. In current systems, XML documents are frequently stored as collection of paths (path index) and value index. As a result, documents or fragments of documents are accessed using path based scans. However, in current XPath query engines, paths are constructed at the last moment; namely, at code generation time. Existing systems separately deal with components of paths; namely, elements, attributes and wildcards. Other XPath operators such as descendants, parenthesis, filters (predicates) are also processed without an understanding of semantic relationships between paths and the other XPath operators. The element-by-element processing in the query engine and path based access in the storage layer, represent an inherent mismatch (referred to as an "impedence mismatch") in the query processing model of current systems. This impedance mismatch between the output of parser (which is input to the code generator) and the output of the code generator results in an inefficient and sometimes error prone code generation process in processing path based queries in current systems. The problems which can result include large plans which may cause stack overflows in some cases and incorrect plans causing stack traces in certain other cases.

What is needed is a solution which provides improved processing of path based queries. Ideally, the solution should transform element-based parse trees into path-based parse trees so as to enable improved processing of XPath queries. The present invention provides a solution for these and other needs.

SUMMARY OF INVENTION

A database system with a path based query engine is described. In one embodiment, for example, a method of the present invention is described for processing of path based queries requesting data from a markup language document, the method comprises steps of: parsing a path based query requesting data from a markup language document to generate a query tree corresponding to the path based query; identifying all paths which may be utilized for obtaining data requested by the path based query from the markup language document; creating a transformed query tree to represent all identified paths; generating a query plan for obtaining data requested by the path based query based on the transformed query tree; and executing the query plan to obtain and return the data requested by the path based query.

In another embodiment, for example, a system of the present invention for processing of path based queries requesting data from a markup language document is described that comprises: a parser module for generating a query tree based on a path based query requesting data from a markup language document; a normalization module for transforming the query tree module into a transformed query tree based on identifying all paths which may be utilized for obtaining data requested by the path based query from the markup language document; an optimization module for generating a query plan for obtaining data requested by the path based query based on the transformed query tree; and an execution module for executing the query plan to obtain and return the data requested by the path based query.

In yet another embodiment, for example, in a database system, an improved method of the present invention is described for processing path based queries in which access to the data maintained in a database is based on paths, the method comprises steps of: before generating a query plan for processing a path based query, determining available paths which may be utilized for obtaining data requested by the path based query; generating a query plan for obtaining data requested by the path based query from the database based, at least in part, on selecting paths to be utilized for obtaining the data from the paths determined to be available; and executing the query plan to obtain data from the database and return the data requested by the path based query.

DETAILED DESCRIPTION

Glossary

Figure 1:
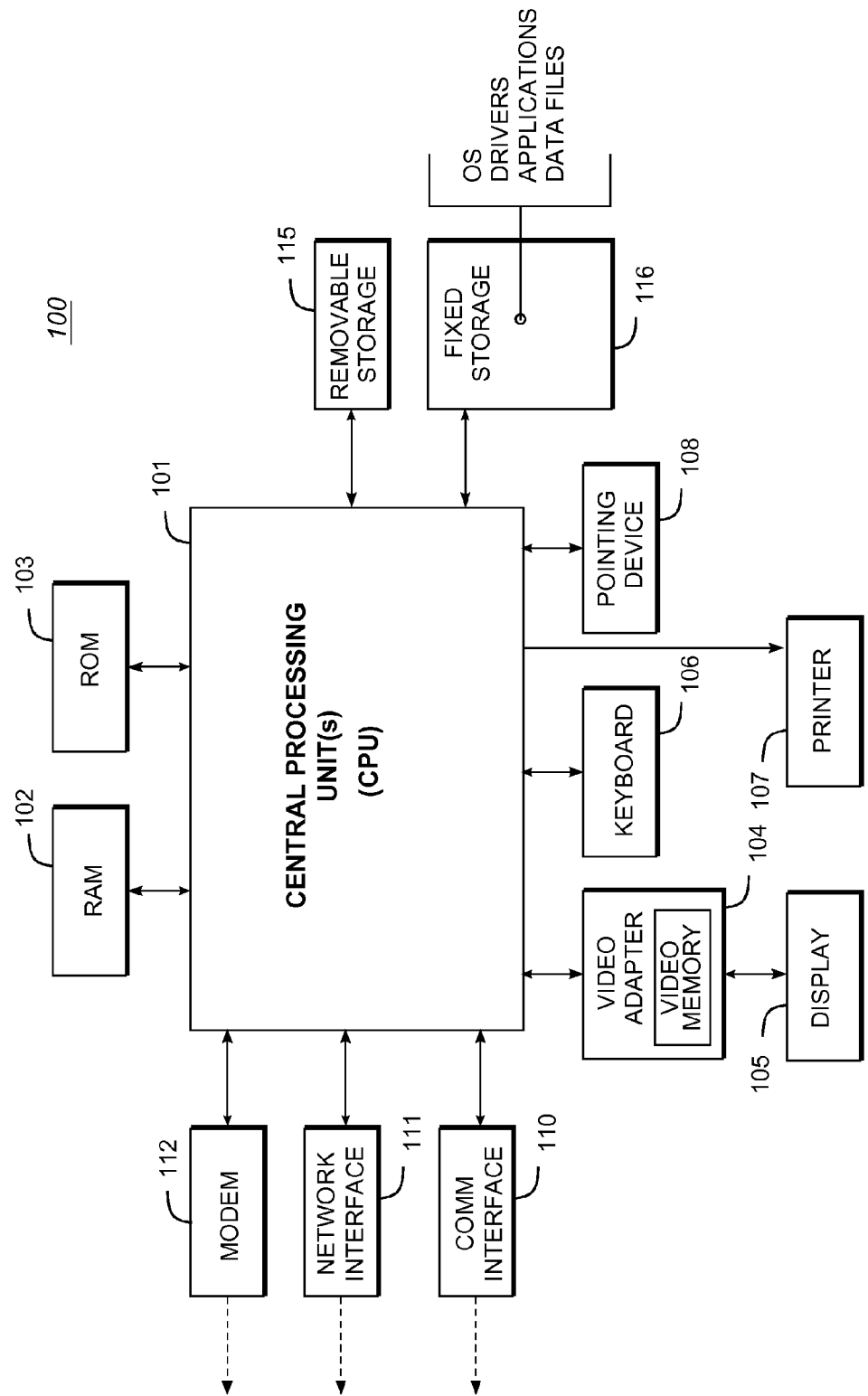
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Access methods: This term is used to represent an interface between the query engine and the storage layer of a DBMS.

DBMS: The term DBMS refers to a database management system.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

Node: In the context of a markup language document (e.g., a XML document), a node corresponds to an element or value in the markup language document. Unlike conventional data in a database (e.g., relational database) which is maintained in a flat structure, information in a markup language document (e.g., XML document) can be represented as a tree structure. The tree structure of a XML document is generated by transforming each element or value in the XML document into a node in the tree.

Path scan: A path scan is a scan which returns identifiers of all the nodes that follow a given path. A path scan invokes services of the storage layer of a DBMS.

Physical query operator: A physical query operator (sometimes simply referred to as an "operator") represents one step in the execution plan for a query.

Query: A query is a request for information from a database based on some selection criterion. A database query is typically written in a database query language, which is a language enabling database users to interactively formulate requests and generate reports. One of the best known query languages is the Structured Query Language (SQL). Another query language which is discussed herein is the XPath query language. In this document the terms "XPath expression" and "XPath query expression" are also used to refer to queries in the XPath query language. An example of a XPath expression is the following: /book/author/first-name.

Query engine: A query engine is a significant component of a DBMS, which in the currently preferred embodiment of the present invention includes the following sub-components: a parser, a normalization/rewrite engine, an optimizer/compiler, and an execution engine. The parser converts query text to a query tree and imposes syntacetic correctness. The normalization/rewrite engine enforces semantic correctness by validating the correctness of information in the query. It also implements methodology of the present invention for transforming the query into an operator tree or query tree that is in a form which facilitates efficient processing by other sub-components of the query engine. The optimizer optimizes a query by choosing the best among various alternative plans for executing the query. The optimizer/compiler also includes a compiler which generates another structure that enumerates the specific execution steps in the appropriate order of execution. In this document the optimizer and compiler are referred to as the optimizer (or optimizer/compiler), unless otherwise indicated. Another sub-component of the query engine is the execution engine which is a virtual machine within a DBMS that interprets the "plan language". The execution engine executes all the sub-commands necessary to execute the query and return results. The execution engine uses access methods to interface with the storage layer of the DBMS.

Query plan: A query plan (sometimes also referred to as an "execution plan" or simply a "plan") is an in-memory data-structure which contains the specific steps (operations) and order of execution for a given query. A query plan is written in a language that the execution engine understands.

Query processing: All phases of query evaluation parsing, normalization, optimization/compilation, execution, and result generation together are termed as "query processing". The life of a query includes all of these phases.

Query tree: A query tree is an in-memory data-structure which represents a query. Initially, the query tree mirrors the query text in the form of an in-memory data-structure and includes exactly the same information as in the user query text.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Storage Layer: Storage layer refers to the component of a DBMS which provides services to the query engine, such as running scans and extracting data from disk into memory buffers, storing data from in-memory buffers to disk and so forth.

XPath: XPath is a query language for querying data in XML documents. The XPath query language is commonly used in Extensible Stylesheet Language Transformations (XSLT) to locate and to apply XSLT templates to specific nodes in a XML document. XPath queries are also commonly used to locate and to process nodes in a XML document that match a specified criteria. XPath provides basic facilities for manipulation of strings, numbers, and booleans. It uses a compact, non-XML syntax to facilitate use of XPath within URIs and XML attribute values. XPath operates on the abstract, logical structure of a XML document, rather than its surface syntax. XPath gets its name from its use of a path notation as in URLs for navigating through the hierarchical structure of a XML document. For further description of XPath, see e.g., "XML Path Language (XPath) Version 1.0" (Nov. 16, 1999), a recommended specification from the W3C, the disclosure of which is hereby incorporated by reference. A copy of this specification is available via the Internet (e.g., currently at www.w3c.org/TR/xpath).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft® Windows operating system. The present invention, however, is not limited to any one particular application or any particular environment. Instead, those skilled in the art will find that the system and methods of the present invention may be advantageously embodied on a variety of different platforms, including Macintosh®, Linux®, Solaris™, UNIX®, FreeBSD®, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like.

Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft® Windows NT, Microsoft® Windows 2000, Microsoft® Windows XP, or Microsoft Windows® Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 2:
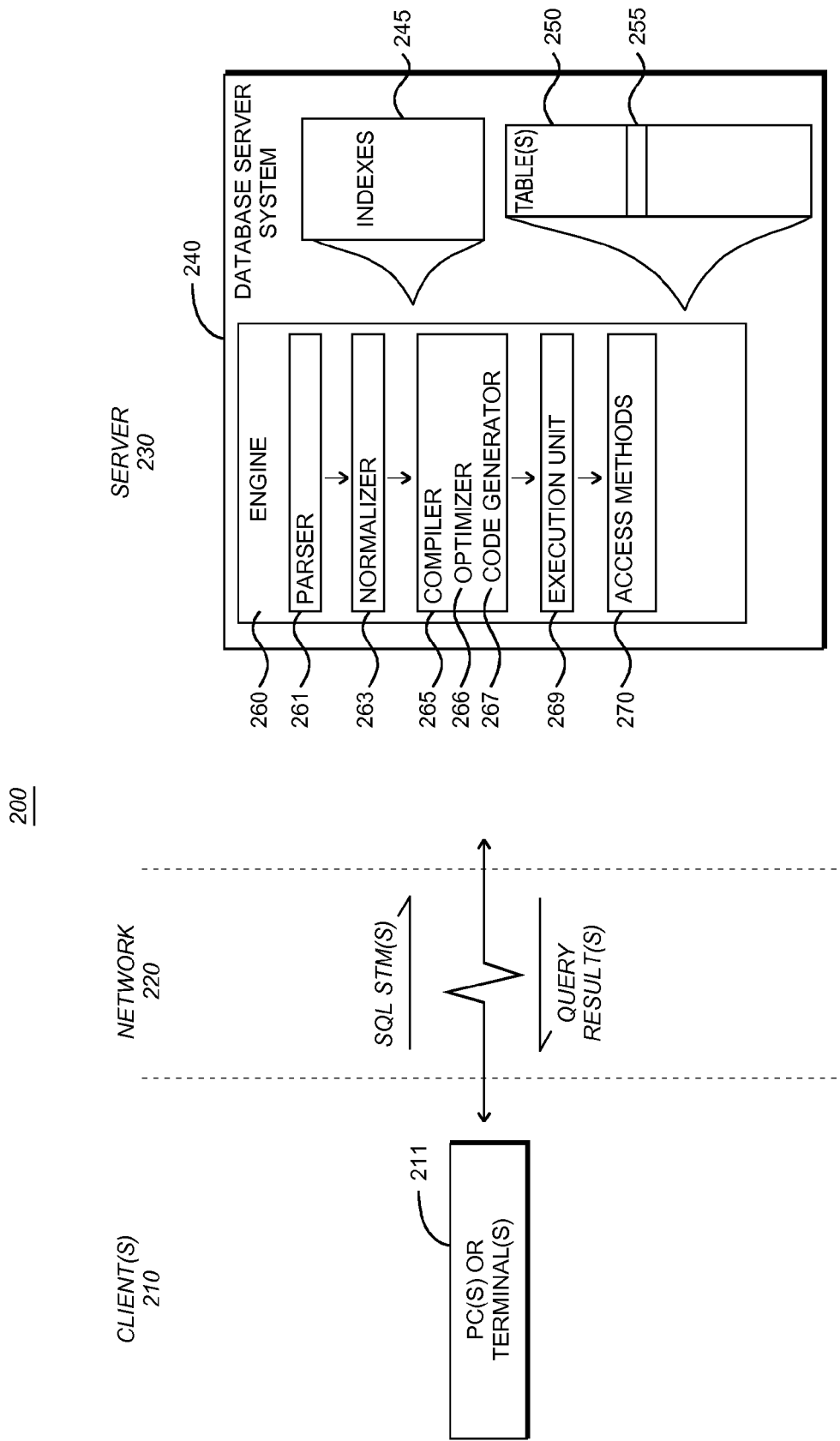
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers or mobile devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Database System with Path Based Query Engine

The present invention provides a query engine that comprises a true path based query processor for more efficient processing of path based queries. The path based query engine of the present invention provides for improved processing of path based queries (e.g., XPath queries) by separating the tree processing phases from the code generation phases of query processing. The present invention provides normalization infrastructure which forms a layer between the query parser and code generator. The input to the normalizer is a query tree and its output is a transformed query tree. With this approach, all of the paths are expanded and validated against path index during tree processing and element-based parse trees are transformed into path-based parse trees. Subsequently, when the code generation phase of query processing begins, all the paths are precisely known and query plans can be made to have a single multi-path operator for entire set of paths resulting from a given XPath pattern. Thus, the present invention addresses the problem of impedance mismatch between the input and the output of the code generator. Also, as a single operator can be used to scan multiple paths, more efficient query plans can be generated. As a result, plan size (in terms of number of operators in a plan) becomes independent of size as well as structure of the XML document. These features of the present invention also serve to reduce the probability of errors such as stack overflows.

In contrast, existing path based query engines typically include an operator for each path, which results in larger plans and, therefore, also utilize significantly greater memory resources during query processing. In existing systems, the code generator has a large burden as it typically receives an incoming query tree containing element nodes and must generate an execution plan containing paths in order to obtain access to the underlying data (i.e., as access to the data is path-based). For example, the code generator typically has to deal with each element separately by taking an element, scanning the element, and then recognizing that two elements together form a path. At the same time, the underlying storage system recognizes only paths and does not recognize single elements. These tasks essentially overload the code generator as it is required to consolidate all of the paths based on the incoming tree of element nodes in addition to generating the code for execution of the query.

With the normalization layer of the present invention, the paths are materialized earlier, so the code generator has a simpler role which it can perform more efficiently. Rather than receiving a query tree containing element nodes, with the present invention the code generator receives a multi-path operator which includes a set of paths. Thus, the code generator receives paths which it can used to generate the operators necessary for accessing the data. This enables the code generator to do its more typical job of generating code without requiring it to processing trees including element nodes in order to generate paths. The design is more modular and by allowing the code generator to remain in its typical role of generating code, it can perform these operations more efficiently, with fewer errors or problems and with reduced memory utilization.

Another benefit of the approach of materializing paths sooner during query processing is that other modules of the query engine can process paths which match the underlying physical implementation rather than element nodes which do not. Throughout the query engine paths are processed in a manner which matches the path-based access to data occurring at the final physical execution level. This homogeneity enables additional path-based optimizations to be applied to further streamline the processing of path based queries. For example, the present invention enables duplicate paths to be forth earlier during query processing, which is not possible in existing query engines which do not materialize paths until the code generation/execution phase. Before describing the present invention in detail, some background information useful for understanding the operations of the present invention will be described.

Structure of XML Documents

XML is a widely accepted model for representing data. In recent years, XML has become pervasive both in representing stored data and communicating data over a network. The following discussion illustrates the operations of the present invention using several examples of a XML document including books in a bookstore. A simple example of a XML document is as follows:

```
1: <bookstore>
2:   <book>
3:     <title>Trenton</title>
4:     <author>
5:       <fname>Mary</fname>
6:       <lname>Bob</lname>
7:     </author>
8:   </book>
9:   <book>
10:    <title>National</title>
11:    <author>
12:      <fname>Joe</fname>
13:      <lname>Bob</lname>
14:    </author>
15:  </book>
16: </bookstore>
```

Figure 3:
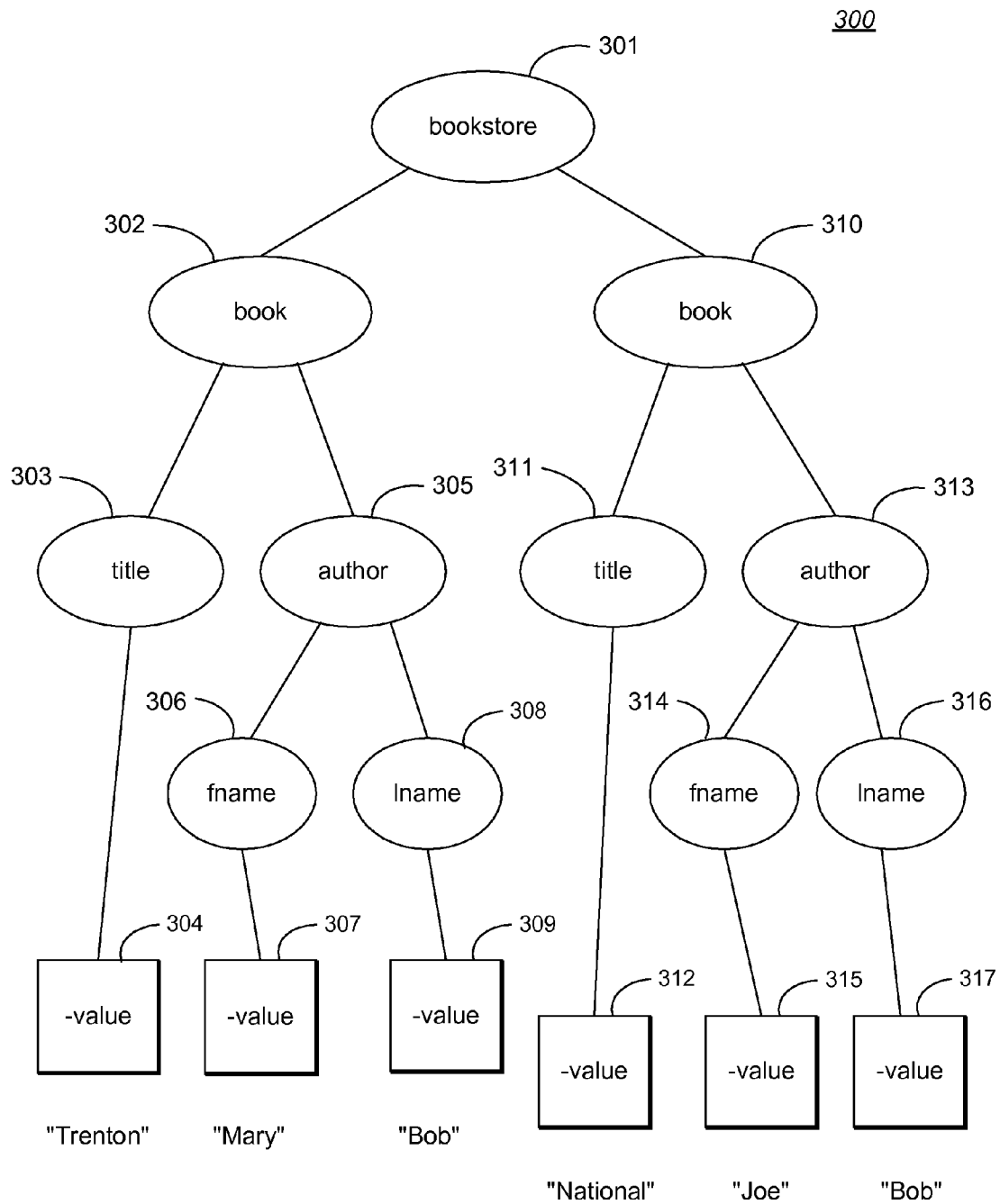
FIG. 3 is a block diagram illustrating a tree representation of a XML document.

Unlike conventional data in a relational database which is maintained in a flat structure, information in a XML document is usually maintained in a tree structure. FIG. 3 is a block diagram 300 illustrating a tree representation of the above XML document. As shown at FIG. 3, each element or value in the XML document has been converted to a node in the tree. These nodes are typically numbered in a pre-determined manner. The number corresponding to each node is called a "node id" of the element or tree node. This concept of node id is important in XML query processing. As shown, nodes of the tree include a bookstore 301, a first book 302, and a second book 310. Children nodes of book 302 provide access to additional information regarding each book, including title 303, and author 305, including author first name (fname) 306 and author last name (lname) 308. Book 310 similarly has associated children nodes 311, 313, 314, and 316. As shown, the title, first name (fname), and last name (lname) nodes of each book have associated data values as shown at 304, 307 and 309 for book 302 and as shown at 312, 315 and 317 for book 310.

As previously described, XPath is a query language for querying data in XML documents. An example of a XPath query for requesting data in the above example XML document is as follows:

/bookstore/book/title

An example of a SQL version of the above XPath query that can be used in the currently preferred embodiment of the system of the present invention is as follows:

{select xmlextract('/bookstore/book/title', xmlcol) from bookstoretable}

The above XPath query would return the following answer based on the example XML document shown above:

Answer: <title> Trenton </title><title> National</title>

Another example of a XPath query is:

/bookstore/book[title='Trenton']/author/lname

A SQL version of this query is as follows:

```
{select xmlextract('/bookstore/book[title='Trenton']/author/lname',
    xmlcol) from bookstoretable}
```

As shown, the above SQL query specifies the path from which data is to be selected (in the form select xmlextract (path)) as well as the column name (xmlcol) and table (bookstoretable). Also, in the above query the "[" operator (or "square bracket" operator) provides for filtering out books based on comparing the title of the book to 'Trenton'. This operator corresponds to a "where" clause in a SQL query. The last name of the author of such books is then projected. The above query would return the following answer based on the example XML document shown above:

Answer: <lname> Bob </lname>

The present invention, in its currently preferred embodiment, is implemented as a component of a XML engine. Further, the XML query engine itself is currently implemented as a component of a database management system (DBMS), which in the presently preferred embodiment is a Sybase® Adaptive Server® Enterprise DBMS (available from Sybase, Inc. of Dublin, Calif.). The components of the XML engine in which the present invention is implemented in its presently preferred embodiment will next be described.

System Components

Figure 4:
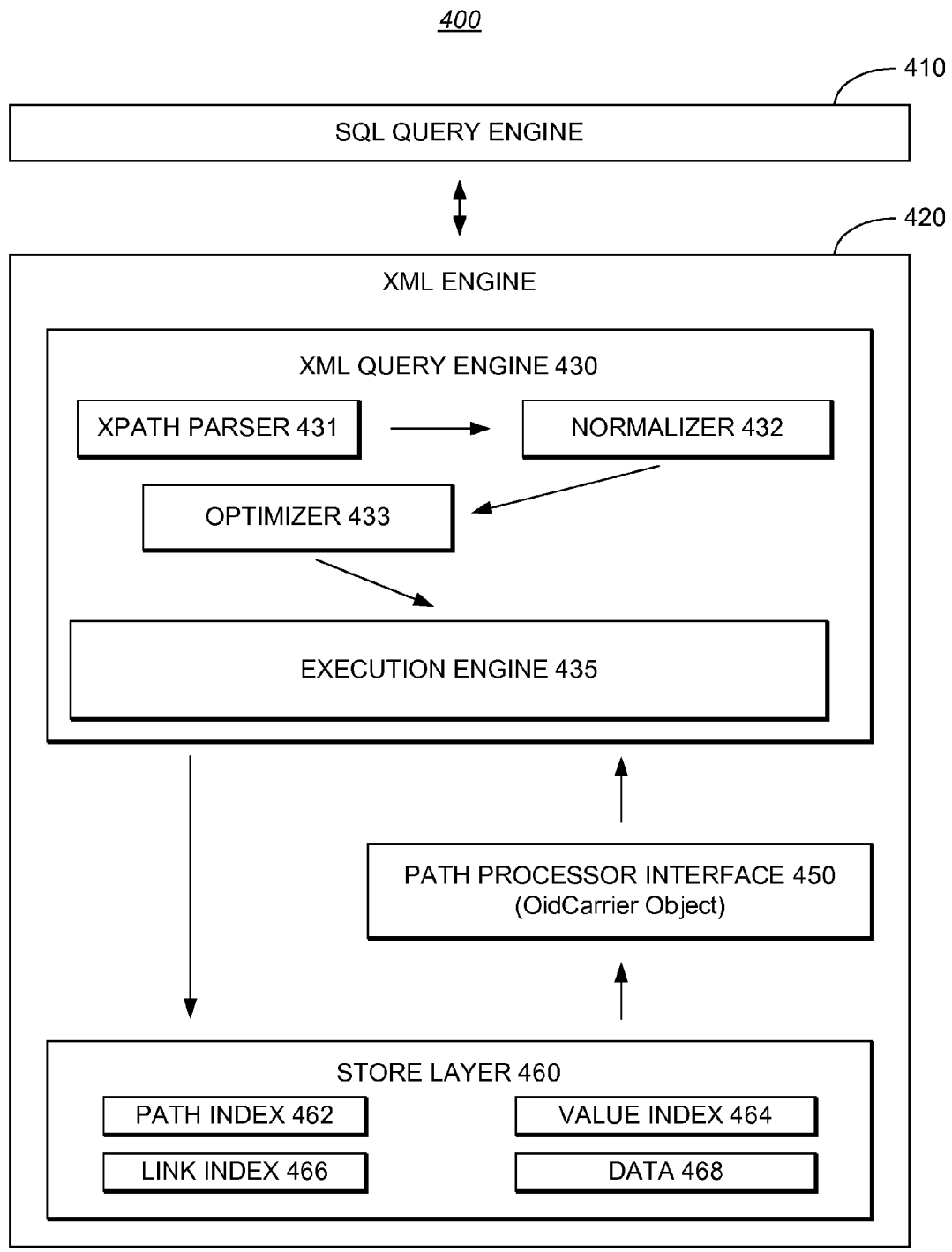
FIG. 4 is a block diagram illustrating an environment in which the present invention may be implemented.

FIG. 4 is a block diagram illustrating an environment 400 in which the present invention may be implemented. The environment 400 includes a SQL Query Engine 410 and a XML Engine 420. The XML Engine 420 provides mechanisms for storage and retrieval of information in XML format. As shown at FIG. 4, the XML Engine 420 includes as core components a XML Query Engine 430, a Path Processor Interface 450, and a Store Layer 460.

The XML Engine 420 includes parse time functionality that transforms each XML document into a collection of bytes that can be stored in a database or file system. Furthermore, a streaming interface over this data is defined to provide fast, random access to the structures within it. The streaming interface includes a fast access structure, which is a flexible interface that enables free movement amongst, and efficient access to the underlying XML data. The XML Engine 420 also has query execution-time functionality for retrieving data in response to queries.

One role of the XML Engine 420 is to transform a XML document for storage in a database. The XML Engine 420 transforms a XML document by analyzing the document as a tree. A XML document can be viewed as a graph where: (1) each element is a node; (2) the text or value (e.g., the value "Mary" as the first name of an author) associated with an element is a leaf node; (3) each attribute (e.g., Style=textbook) is a leaf node; (4) each node is labeled uniquely; and (5) all nodes are labeled in the order they occur in the source document.

During the transformation process, each node is labeled uniquely by assigning an integer to each node in a monotonically increasing order. This integer is referred to as object ID or OID. During this process, each element of the source document is visited in turn and each element is numbered based upon the order it occurs in the document. An object is created by the XML Engine 420 which contains data from the transformed document together with auxiliary structures to aid in faster access to the data. During the transformation process, each element of a XML document is treated as a node or leaf (i.e., terminal node) and these nodes and leaves are annotated to provide faster access to data. The structure of the tree itself is derived from the structure of the source document.

As shown at FIG. 4, a path index 462, a value index 464, a link index 466, and data 468 are maintained by the store layer 460 of the XML Engine 420. The link index 466 stores linkage information about the parent-child relationship of nodes. This linkage information enables the source document to be recomposed when required. The path index 462 stores hierarchical information about particular items of data in the order that these items occur in the source document. The value index 464 stores values for a given path in a sorted order to enable more efficient searches. The data 468 represents data that is associated with particular nodes. For further description of an environment in which the present invention may be implemented, see e.g., commonly-owned U.S. Pat. No. 6,799,184 titled "Relational Database System Providing XML Query Support".

XML data is stored in the database system in an image column in a parsed format, or in the text, or in image columns as "raw" XML. In a parsed format, it contains a path index 462, link index 466, and value index 464. The Store Layer 460 of the XML Engine 420 converts the text representation of these indexes and data 468 into an internal representation which is efficient for storage. The Store Layer 460 is also responsible for converting the representation to its textual form when the Path Processor Interface 450 requests a certain piece of information during query processing. The Store Layer 460 provides for performing scans. A simple path scan accepts path requests from the XML Query Engine 430 and returns back node IDs. It identifies the nodes that satisfy the XPath expression and creates an instance of an object called "OidCarrier" as discussed below in more detail.

As shown at FIG. 4, a XPath query may be transmitted to the XML Engine 420 by the SQL Query Engine 410. For instance, a user may submit the following SQL query requesting information from the database:

```
{select xmlextract('/bookstore/book[title='Trenton']/author/lname',
    xmlcol) from bookstoretable}
```

From the above query, the SQL Query Engine 410 extracts the following XPath portion of the above expression and sends it to the XML Query Engine 430:

```
/bookstore/book[title='Trenton']/author/lname
```

The XPath portion of the query is handled by the XML Query Engine 430, which includes query execution-time functionality for retrieving data in response to queries. The XML Query Engine 430 includes a XPath parser 431, a normalizer 432, an optimizer 433, and an execution engine 435. Within the XML Query Engine 430, the XPath parser 431 parses the XPath portion of the query received from the SQL Query Engine 410 and converts it into a query tree representation. The XML Query Engine also has been enhanced to include a normalizer 432 for normalization of the XPath expression in accordance with the methodology of the present invention. (It should be understood, however that the normalizer may be implemented as part of the XPath parser rather than a separate module, if desired.) The normalized query tree representation generated by the normalizer 432 is then sent to the optimizer 433 which generates a physical query plan (execution plan) for execution of the query. The query plan is then provided to the execution engine 435 which interprets the query plan and executes it with the support of the store layer 460. It should be noted that although the original query submitted by the user appears to only include a single path, execution of the query plan may break this expression into multiple paths. For instance, a first path may try to extract all the titles while another path may extract the last names, and so on and so forth.

The Path Processor Interface 450 serves as an interface between the XML Query Engine 430 and the Store Layer 460. The Path Processor Interface 450 is an abstract API which accepts path requests from the XML Query Engine 430 and returns back node ids (corresponding to persisted nodes of the XML document). The Path Processor Interface 450 invokes services of the Store Layer 460 to identify the nodes that satisfy the query expression (e.g., XPath expression) and returns an instance of an abstract object named "OidCarrier". This OidCarrier object is returned back to the query layer (i.e., XML Query Engine 430) as shown at 450 at FIG. 4.

The XML Query Engine 430 uses various services of the OidCarrier such as getValue( ) and/or compare( ) to compute the results of the query. However, the XML Query Engine 530 is not aware of the node ids stored in OidCarrier. In other words, OidCarrier acts as a medium to carry node ids through various components of the system. Before describing the operations and methodology of the present invention in more detail, the some terms and concepts that are frequently used in this document will be discussed.

Path Based Query Expression Concepts

Path Index

A "path index" is a collection of all distinct paths in a XML document starting from the root node. For example, for document in FIG. 3, the path index contains following paths:

```
/bookstore
/bookstore/book
/bookstore/book/title
/bookstore/book/title/__value
/bookstore/book/author
/bookstore/book/author/fname
/bookstore/book/author/fname/__value
/bookstore/book/author/lname
/bookstore/book/author/lname/__value
```

Simple Path or Path Expression

For purposes of the following discussion, a "simple path" or "simple path expression" can contain only following components:

```
1.   element names
2.   attribute names
3.   /
4.   *
5.   //
6.   . (dot, refers to the present context)
```

Examples include the following:

```
/bookstore/book//fname,
/*//author/*,
```

```
//title,
//book/author/*
/bookstore/book/.//author,
/*//author/./*,
//fname/./.author/./*/fname//.,
//book/./.author/*
```

Notice that there are no filter, function, parenthesis, union, intersection and other such constructs in these simple path expressions.

Path Materialization

Given a path expression path_e and a set of path indexes, find out a materialization of this path expression as a "Multi-path". In other words, given a path expression, find out all the instance paths that satisfy the expression. Note that the materialized paths are the existing physical paths in a given document. They are validated against corresponding path indexes. For example, consider the following path:

```
/ bookstore//fname
```

The expanded path (Multi-path) would be as follows:

```
/bookstore/book/author/fname
```

Also, depending upon the nature of the document this may have additional paths, such as the following:

```
/bookstore/book/editor/fname
/bookstore/magazine/article/author/fname
```

Complex Path Expression (Synonymous to XPath Query)

In addition to simple XPath expression, a "complex path expression" contains other XPath query language constructs such as filter, functions, parenthesis, union, intersection, AND, and OR. The following are examples:

```
/bookstore/(book | magazine)/.//title,
/bookstore/book[author/fname="John"]/title
```

Path Distribution

The XPath constructs such as filter, functions, parenthesis and the like mentioned above, together with the simple path expressions form an algebraic system. The system and methodology of the present invention exploits the distributivity of this system. As an example of path distributivity, consider the following representation of the complex path expression discussed above:

```
/bookstore/book/.//title | /bookstore/magazine/.//title
```

It can be observed that the paths have been distributed (and concatenated) from both left and right over parenthesis as well as '|' (the OR operation).

Impedance Mismatch Problem

When a XML document is parsed the XML engine creates path, value and link indexes and all these indexes are stored on disk in order to enable faster data retrieval. The main method of accessing data in this parsed document is to provide a path that contains only element names, attribute names and steps "/". That is, the access to the data is based on (very primitive) paths.

On the other hand when a user query seeking access to the data is parsed, all its element/attribute names are recognized and the parser constructs tree nodes corresponding to each element or attribute. The following is an example of a query tree for the XPath expression /bookstore/(book|magazine)/.//title:

```
1: TREE:
2: UNARY CHILD OPERATION
3:     ELEMENT NAME OPERATION on bookstore
4:         PARENTHESES EXPRESSION
5:             BEGIN INSIDE EXPRESSION
6:                 UNION OPERATION
7:                     ELEMENT NAME OPERATION on book
8:                     ELEMENT NAME OPERATION on magazine
9:             END INSIDE EXPRESSION
10:    ELEMENT NAME OPERATION on .
11:        DESCENDANT OPERATION
12:            ELEMENT NAME OPERATION on title
```

As can be seen from the above query tree, the query tree contains nodes for individual element names, such as bookstore, book, and the like. However, the paths are scattered among various tree nodes and they need to be derived by traversing the tree from node-to-node. This is referred to as the problem of impedance mismatch between the input and the output of the code-generator. The input consists of a tree as shown above. The output is expected to be the query plan consisting of physical operators that contain appropriate paths for accessing the document data. In principle, the function of code-generator is simply to generate physical plans. But in this case, it is overloaded with the task of recognizing query semantics and generating appropriate paths. This results in several problems in prior art systems including that the code generator becomes complex in implementation. Also, incorrect results may be produced in some situations where there is a need to perform a look-ahead before resolving the current descendant or a wildcard. In addition, as wildcards and descendants in a query are resolved at compile-time, a separate path scan must be created for each path. Thus, the number of operators in the query plan are proportional to the number of distinct paths in the document that match the query pattern. This can result in the creation of very large query plans; sometimes even for apparently short queries and can lead to stack overflows in some cases.

For example, consider the query expression /bookstore// tolower(.//book/title). There are two path patterns in this query: /bookstore// and /bookstore//.//book/title. The code-generation time resolution of descendants is too late to identify the structural equivalence of this path expression as follows: /bookstore//.//book/title equivalent to /bookstore// book/title. Since it fails to identify such equivalence, in some cases the code-generator generates incorrect plans. Note that, if this equivalence is identified at tree processing time before code generation, the code generator will be able to obtain a correct set of paths. It is "correct" because it is valid against the path index of the document before code generation. Hence a correct query plan will be generated.

One naive approach which could be used to address the above problem is for the database system to provide an element-by-element scan. For instance, with the above example query such an approach will first identify bookstore node and from its node id it will perform forward traversals until it finds all of the titles. However, this approach results in considerably lower performance. A more sophisticated approach might involve construction of finite state machines for XPath queries and using an event-based document parser to flow through the state machine which does not have the restriction of path based access to the XML document. However, even if feasible, this approach would require construction of a new system for processing path based queries. The preferred approach taken with the present invention is to utilize parsing and code generation components of an existing path based query engine, but to introduce the concepts of query rewrites and path transformations to reduce impedance mismatch between the output of query parser and input of the code generator.

Olteanu, et al in "XPath Looking Forward", Lecture Notes in Computer Science, Springer Verlag, Vol. 2490, March 2002, discusses the use of path transformations for eliminating reverse axes in XPath queries. However, this work is focused on XML stream processors where a query engine gets to see the data only once. In that system environment, the traditional approach of a query engine invoking access methods of a storage layer does not exist. Thus, the system described by Olteanu et al does not deal with the path based access methods discussed above which are a focus of the present invention. It also does not consider the XPath constructs, such as, parenthesis, XPath functions, and set operators which are very common in real-life XPath engines. Pierre Geneves and Kristoffer Rose, in "Compiling XPath into a State-less Forward-only Subset", ACM Symposium on Document Engineering, 2-4 Nov. 2005, Bristol, UK, pp. 52-54 also study the problem of converting XPath queries into equivalent XPath queries that do not have reverse references. However, this work again studies the problem in the context of XML stream processor.

The problem of minimization of XPath queries for efficient evaluation is also discussed by Chan et al, in "Taming XPath Queries by Minimizing Wildcard Steps", Chan et. A., 30th VLDB Conference, Toronto, Canada, 2004 and by Peter Wood in "Minimising Simple XPath Expressions", WebDB 2001: 13-18. Although Chan et al and Wood also use a query transformation approach, they focus on different subsets of XPath language. Jiang et al in "Path Materialization Revisited: An Efficient Storage Model for XML Data", AICE2000 also uses the term "path materialization", but does so in a different context. Jiang et al refers to paths stored in a relational table as materialized paths.

The present invention combines the concepts of query rewrites and path transformations with the idea of algebraic path distribution in order to understand query semantics correctly. This approach assists in making explicit the hidden semantics of the XPath query language. During tree processing, all of the paths are expanded and validated against the path index. Thus, all the paths are precisely known when the code generation phase of query processing begins and query plans can be made to have a single multi-path operator for entire set of paths resulting from a given XPath pattern. (It should be noted that in the currently preferred embodiment, a multi-path operator is also used when access is through a single path as this approach avoids the need for a separate single path operator.) This addresses the problem of impedance mismatch between input and output of code generator, enables more efficient query plans to be generated and reduces the probability of errors. With the present invention, the size of the query plan is dependent only on the nature of the query and is independent of the structure and statistics of the XML document. This improves both memory utilization of the plan and performance of the query.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

High Level Tree Transformation Methodology

The operations of the present invention may be illustrated by example which describes the processing of a particular XPath expression. For purposes of this discussion, the following example XPath expression is used:

---
//a[./b]//c

---

Figure 5A:
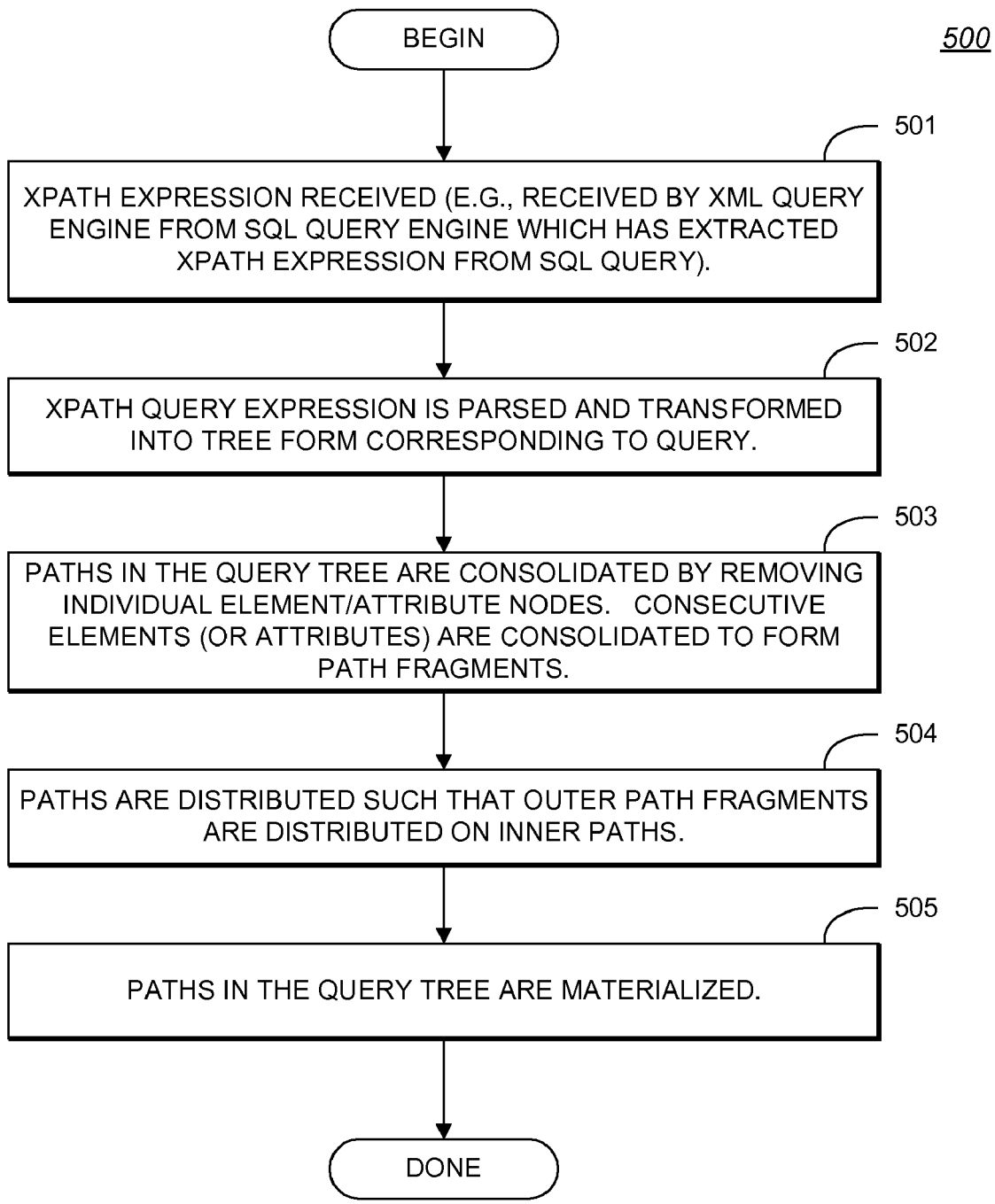
FIG. 5A comprises a flowchart illustrating the high level method steps of operation of the present invention in processing a path-based query.

FIG. 5A comprises a flowchart 500 illustrating the high level method steps of operation of the present invention in processing a path-based query (e.g., the above example XPath expression). At step 501, the XPath expression is received. The above XPath expression may, for instance, be received by the XML query engine of the present invention from a SQL query engine. (Note that the SQL query engine may already have extracted the XPath expression from a SQL query).

At step 502, the XPath query expression is parsed and transformed into tree form corresponding to the query. In this example, the following query tree would be generated by the query engine based on the above XPath expression:

---
1: UNARY CHILD OPERATION
2:   DESCENDANT OPERATION
3:     ELEMENT NAME OPERATION on a
4:     FILTER OPERATION
5:       ELEMENT NAME OPERATION on .
6:         ELEMENT NAME OPERATION on b
7:       DESCENDANT OPERATION
8:         ELEMENT NAME OPERATION on c

---

It should be noted that at the completion of step 502, the query tree is exactly like the original query expression and contains a node for each element in the path. Next, paths in the query tree are consolidated by removing individual element/attribute nodes at step 503. Consecutive elements (or attributes) are consolidated to form path fragments. The tree is compacted and nodes no longer contain individual element/attribute names. After this path consolidation, the query tree would be as follows:

---
1:   PATH OPERATION ON //a
2:     FILTER OPERATION
3:       PATH OPERATION ON ./b
4:     PATH OPERATION ON //c

---

At step 504, the paths are distributed such that the outer path fragments are distributed on the inner paths. After path distribution, the query tree would be as follows:

---
1:   PATH OPERATION ON //a
2:     FILTER OPERATION
3:       PATH OPERATION ON //a/./b
4:     PATH OPERATION ON //a//c

---

At step 505, the paths in the query tree are materialized as described in more detail below and in FIG. 5B. After materializing the first path, the query tree will look as follows:

---
1: PATH OPERATION ON /root/a, /root/p/a
2:   FILTER OPERATION
3:     PATH OPERATION ON //a./b < This expr also gets materialized.
4:   PATH OPERATION ON //a//c  < This expr also gets materialized.

---

Here the outer context for the filter operation is known; it is /root/a and /root/p/a. Thus, one can now define a vector that contains these two paths. Each path from this vector is passed to the path materialization function along with the inner path expression that needs to be materialized.

When expanding //a/./b, which is //a/b, only those paths from path index that the outer context allows are considered (i.e., only paths that start with either /root/a or /root/p/a and end in b). In this manner, only those paths are scanned that exist in the path index of the document. For expanding //a//c, the same path vector is used.

Assume that //a//c expands into /root/a/c and /root/p/a/x/y/c and there is a predicate beyond c in the query, such as //a[./b]//c[d=8]. Then the path inside the second predicate after distribution will look as follows: //a//c/d. It's outer context becomes /root/a/c and /root/p/a/x/y/c.

Figure 5B:
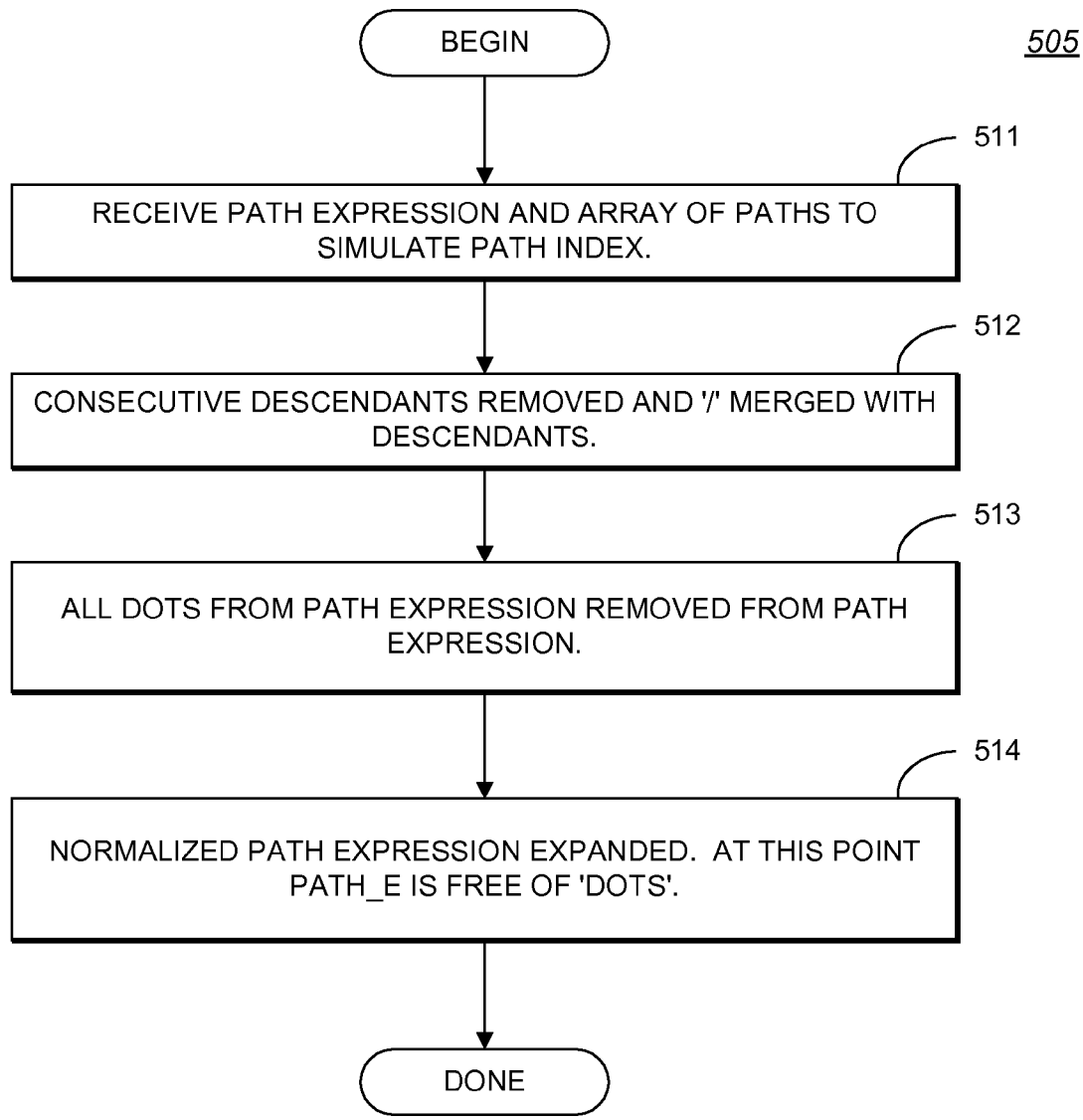
FIG. 5B is a high-level flowchart (corresponding to the last step of FIG. 5A) illustrating the methodology of the present invention for path materialization in further detail.

FIG. 5B is a high-level flowchart 505 (corresponding to the last step of FIG. 5A) illustrating the path materialization methodology of the present invention in further detail. At step 511, a string containing the path expression and an array of paths to simulate a path index is received. (Note in this example a string containing the "path expression" is used rather than a tree as in the currently preferred embodiment).

At step 512, consecutive descendants are removed and '/' merged with descendants. Examples of these operations are as follows:

/a////b-->/a//b

/a///b-->/a//b (Note that /a///b is not a legal expression if a user specifies it. But the system still uses this rule because it may internally generate such a query after appending two paths.)

All the dots from the path expression are removed from the path expression at step 513. This is illustrated by the following examples:

---
/a/b/.    -->  /a/b
/a/./b    -->  /a//b
/a//./././b  -->  /a//b
/a/*/.    -->  /a/*
/a/./*    -->  /a/*
./*/a     -->  /*/a

---

At step 514, the normalized path expression is expanded. At this point path_e is free of 'dots'. For example, the expanded path expression may be as follows:

---
/a/b//z1/z2//z3/z4/*/c/d//z5/z6
---

Figure 5C:
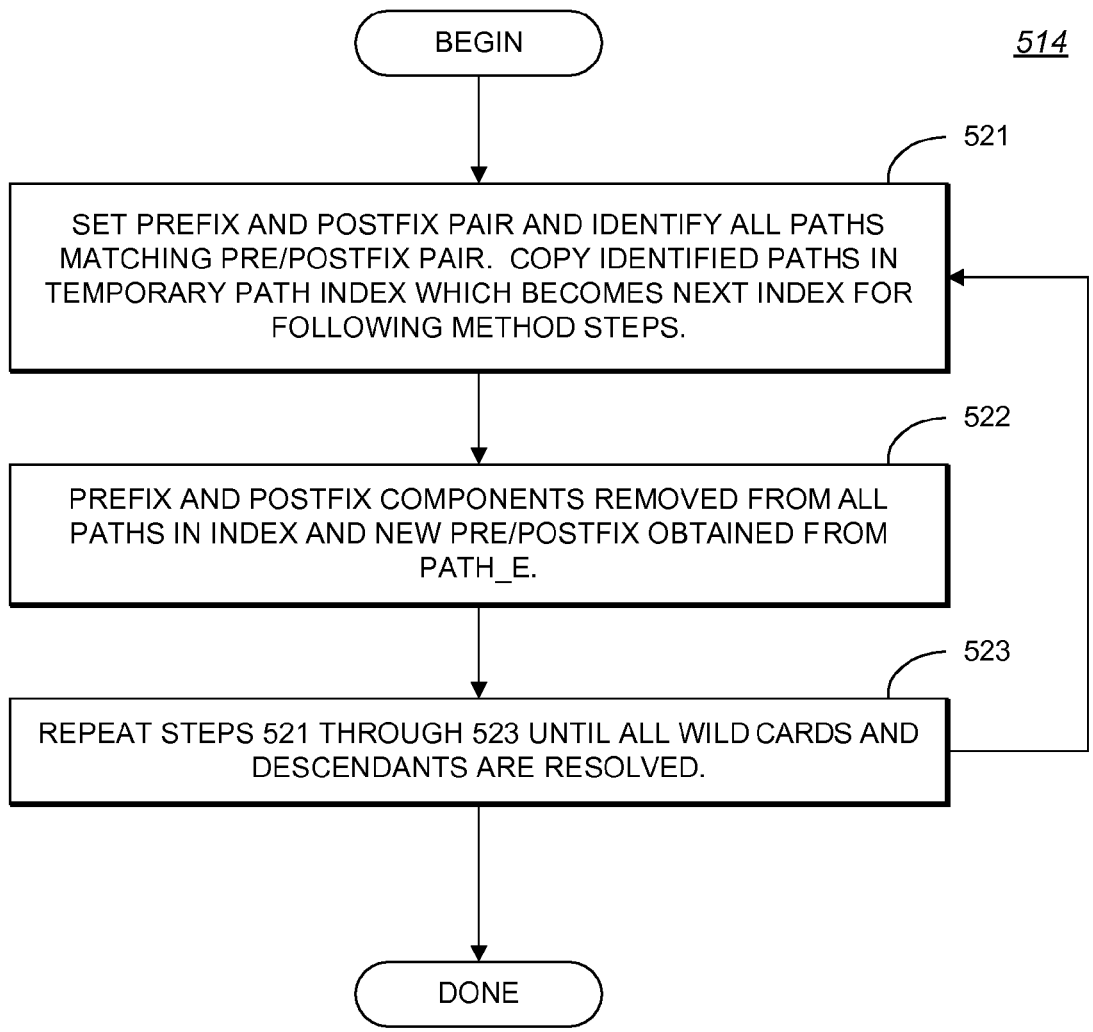
FIG. 5C is a high-level flowchart (corresponding to the last step of FIG. 5B) illustrating the methodology of the present invention for expansion of the normalized path expression in further detail.

FIG. 5C is a high-level flowchart 514 (corresponding to the last step of FIG. 5B) illustrating the methodology of the present invention for expansion of the normalized path expression in further detail. At step 521, a prefix and postfix pair are set (e.g., set prefix=/a/b and postfix=/z5/z6) and all paths matching this pre/postfix pair are identified and such identified paths are copied in a temporary path index. This becomes the next index for the remaining method steps described below.

At step 522, the prefix and postfix components are removed from all the paths in index and a new pre/postfix is obtained from path_e. For example, for the first time the input to the path expansion method (Path_Expand) will be:

---
Path_e: /a/b//z1/z2//z3/z4/*/c/d//z5/z6
Prefix: /a/b
Postfix: /z5/z6
---

At step 523, steps 521 and 522 are repeated until all the wildcards and descendants are resolved.

Example of Query Tree Transformations

The following will illustrate steps 501 to 504 as shown in FIG. 5A using illustrations showing nodes of the transformed query tree after each of these steps. Assume that in this case, the method starts with the following XPath query expression at step 501:

---
//a/b[./c/d]//e/f
---

At step 502, the following query tree is generated based on the above query expression:

---
1: UNARY CHILD OPERATION
2:     DESCENDANT OPERATION
3:         ELEMENT NAME OPERATION on a
4:             ELEMENT NAME OPERATION on b
5:                 FILTER OPERATION
6:                     ELEMENT NAME OPERATION on.
7:                         ELEMENT NAME OPERATION on c
8:                             ELEMENT NAME OPERATION on d
9:                 DESCENDANT OPERATION
10:                     ELEMENT NAME OPERATION on e
11:                         ELEMENT NAME OPERATION on f
---

Figure 6A:
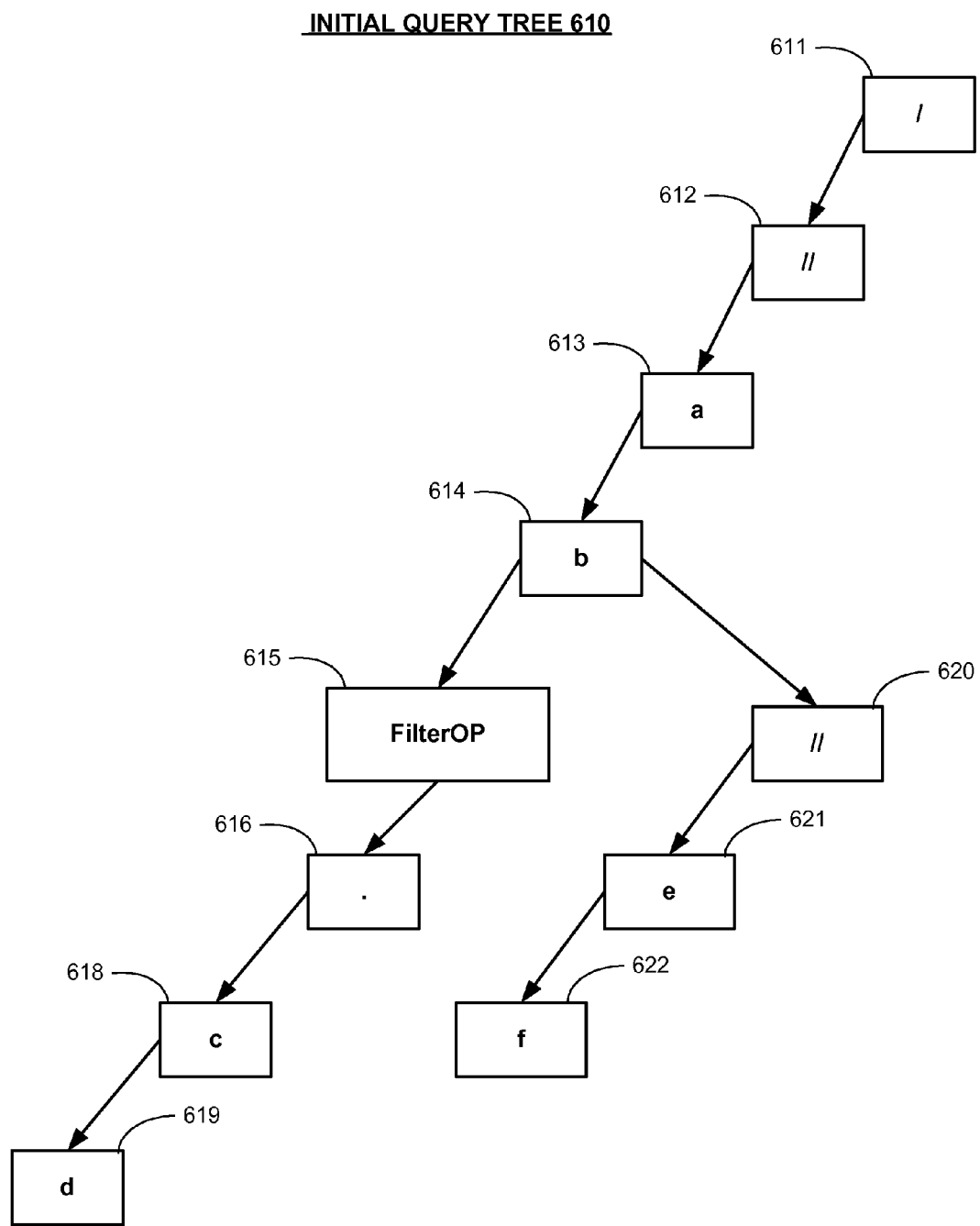
FIG. 6A is a diagram illustrating of a query tree representing the parsed path based query in tree form.

FIG. 6A is a diagram illustrating the initial query tree 610 representing the parsed path based query in tree form. As shown, the parsed query tree has a structure exactly like that of the query and contains nodes 611-622, with each of nodes 611-622 corresponding to an element in the path.

Next, the paths are consolidated as shown at step 503 at FIG. 5A. The following shows the structure of the query after path consolidation:

---
1:   PATH OPERATION ON //a/b
2:       FILTER OPERATION
3:           PATH OPERATION ON ./c/d
4:       PATH OPERATION ON //e/f
---

Figure 6B:
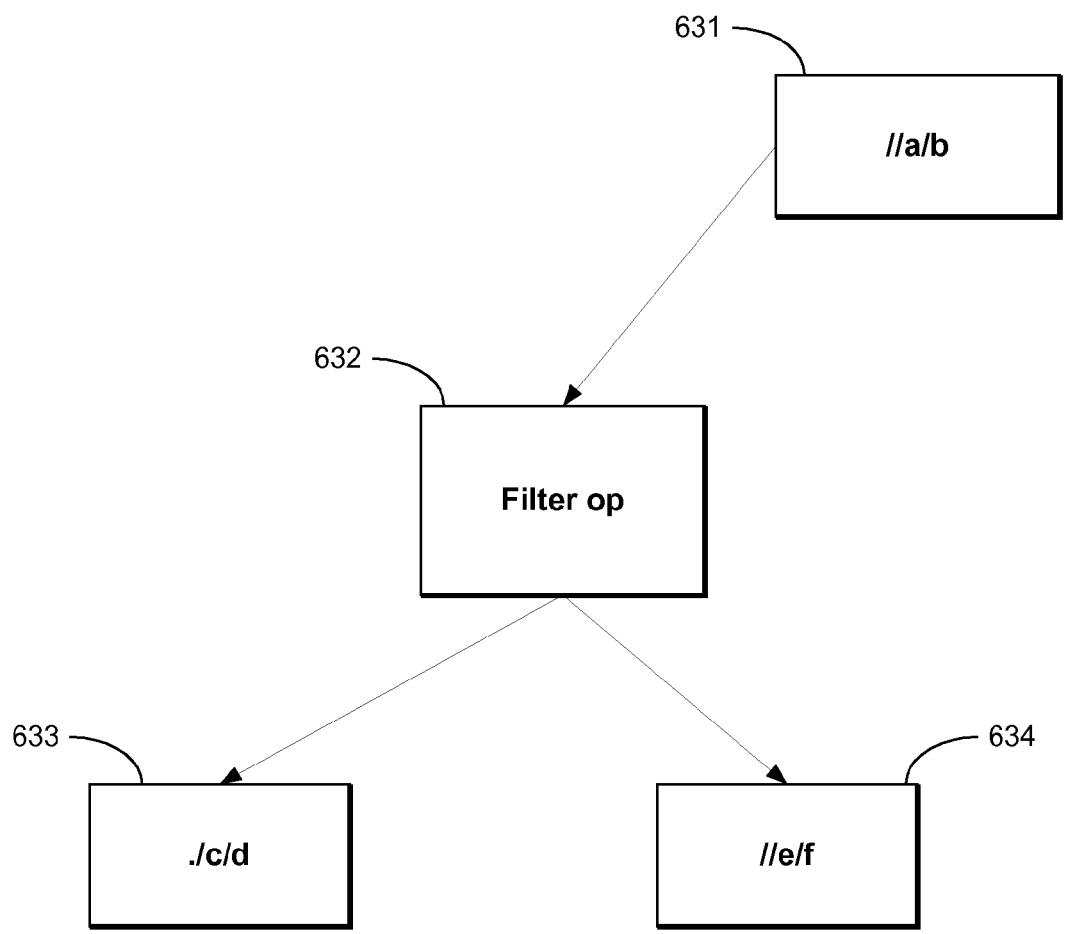
FIG. 6B is a diagram illustrating a path consolidated query tree, which represents the transformed structure of the query tree after path consolidation.

FIG. 6B is a diagram of a path consolidated query tree 630, which represents the transformed structure of the query tree (i.e., the initial query tree 610 of FIG. 6A) after consolidation of the paths as provided at step 503 at FIG. 5A. As shown, consecutive elements (or attributes) of the initial query tree have been consolidated to form path fragments. The path consolidated query tree 630 has been compacted and only contains four nodes 631-634. As shown, nodes 631, 633, 634 no longer contain individual element/attribute names. Query tree 630 includes fragments such as ./c/d at node 633 and //e/f at node 634 which do not start from the root. In //a/b at node 631, the beginning '//' indicates "starting from the root the tree". However, the '//' in //e/f at node 634 is relative to b.

The final step before path materialization is path distribution which is shown at step 504 at FIG. 5A. After path distribution, the query tree is transformed to be as follows:

---
1: PATH OPERATION ON //a/b
2:     FILTER OPERATION
3:         PATH OPERATION ON //a/b/./c/d
4:     PATH OPERATION ON //a/b//e/f
---

Figure 6C:
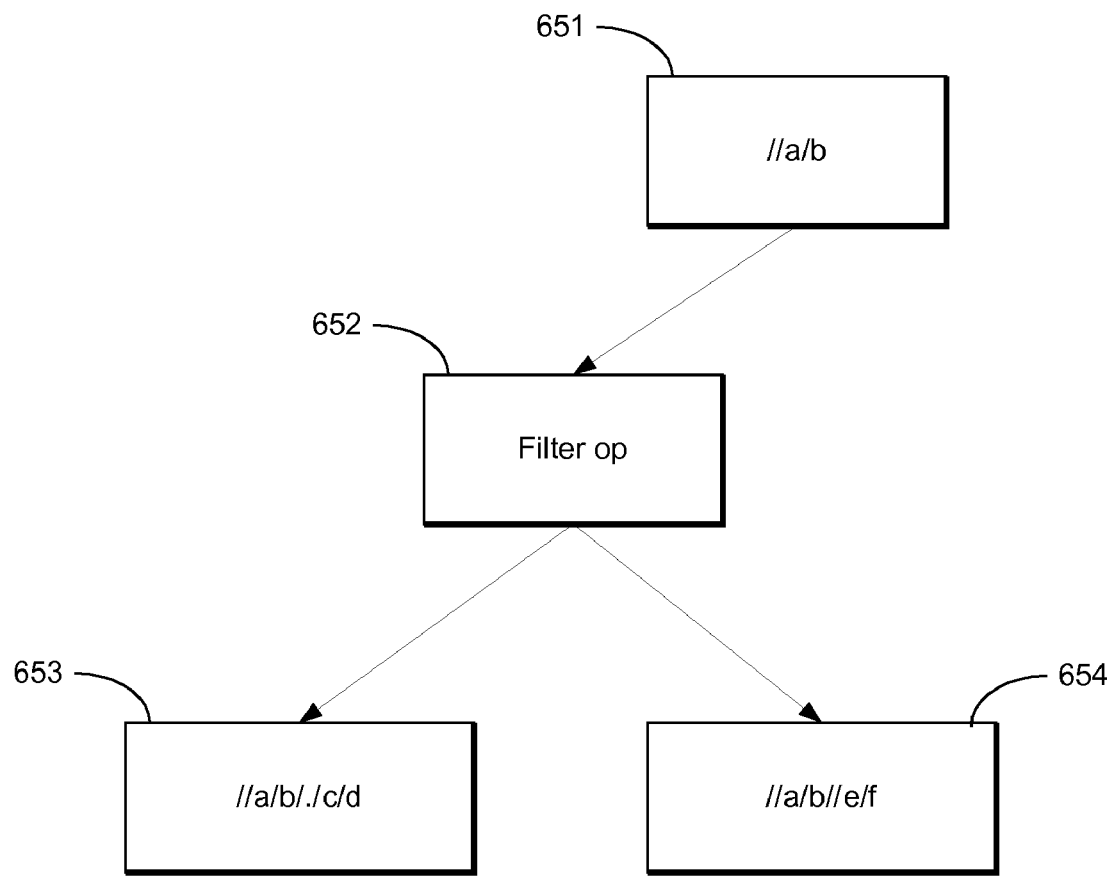
FIG. 6C is a diagram of a path distributed query tree, which represents the transformed structure of the query tree after path distribution.

FIG. 6C is a diagram of a path distributed query tree 650, which represents the transformed structure of the query tree after path distribution as provided at step 504 at FIG. 5A. As shown, the path distributed query tree includes nodes 651-654. The inner paths ./c/d and //e/f, respectively are relative to b. In order to evaluate any of these paths, one must start from root, first reach b, and then, traverse the relative paths. As shown, after the path distribution step, the outer path fragment //a/b is distributed on the inner paths ./c/d and //e/f. This converts these two paths to be absolute paths that start from the root: //a/b/./c/d and //a/b//e/f as shown at nodes 653 and 654, respectively. After the path distribution step has been completed, paths are materialized as provided at step 505 at FIG. 5A and discussed in detail above. The transformed query tree that is generated can then be used to generate a more efficient query plan for execution of the path based query as illustrated in the following discussion.

Query Plans Generated Using Present Invention

The following discussion compares query plans which are generated with the present invention with those that are generated in prior art systems. The following example path based query which includes a predicate, a descendant, and a wildcard is used for purposes of this discussion:

---
/a/b[.//b2]//c/*/d
---

Further assume that the XML document is as follows:

---
1: <a>A
2: <b>B1
3:         <c>C1 <f>ff1 <d>dd1</d> </f> </c>
4:     </b>
---

```
 5:     <b>
 6: <b1> <b2>
 7: <c>C2<f>ff2<d>dd2</d></f></c>
 8:         </b2>
 9:       </b1>
10:     </b>
11:     <b>
12: <b2>
13:         <c>C21 <f>ff21 <d>dd21</d> </f> </c>
14:         </b2>
15:     </b>
16:     <b>
17:         <b3>
18: <b4>
19:             <c>C3 <f>ff3 <d>dd3</d> </f> </c>
20:         </b4>
21: </b3>
22:     </b>
23: </a>
```

The distinct paths in this XML document are as follows:

```
/a
/a/b
/a/b/c
/a/b/c/f
/a/b/c/f/d
/a/b/b1
/a/b/b1/b2
/a/b/b1/b2/c
/a/b/b1/b2/c/f
/a/b/b1/b2/c/f/d
/a/b/b2
/a/b/b2/c
/a/b/b2/c/f
/a/b/b2/c/f/d
/a/b/b3
/a/b/b3/b4
/a/b/b3/b4/c
/a/b/b3/b4/c/f
/a/b/b3/b4/c/f/d
```

The following is an example of the large query plan generated by a prior art XML engine based on the above example query:

```
  1: ----------------------------------
  2: OP1
  3: INTERSECT OPERATOR: 0x215c26e0
  4: Path is /a/b
  5: INTERSECT MODE is RHSECONDARY
  6: PRIMARY in 29
  7: SECONDARY in 0
  8: LH PRIMARY in 8
  9: LH SECONDARY in 0
 10: RH PRIMARY in 28
 11: RH SECONDARY in 27
 12: ----------------------------------
 13:   OP2
 14:   UNION ORDER OPERATOR
 15:   PRIMARY in 8
 16:   SECONDARY in 0
 17:   LH PRIMARY in 11
 18:   LH SECONDARY in 10
 19:   RH PRIMARY in 14
 20:   ----------------------------------
 21:     OP3
 22:     GROUP OPERATOR: 0x215c1d70
 23:     PRIMARY in 11
 24:     SECONDARY in 10
 25:     LH Result in 9
 26:     RH Result in 6
 27:     ----------------------------------
 28:     OP4
 29:     SCAN OPERATOR: 0x215c1a20
 30:     SIMPLE SCAN ON: /a/b
 31:     PROJECTION in 9
 32:     ----------------------------------
 33:     OP5
 34:     SCAN OPERATOR: 0x215c6880
 35:     SIMPLE SCAN ON: /a/b/b1/b2
 36:     PROJECTION in 6
 37:     ----------------------------------
 38:   OP6
 39:   GROUP OPERATOR: 0x215c21b0
 40:   PRIMARY in 14
 41:   SECONDARY in 13
 42:   LH Result in 12
 43:   RH Result in 7
 44:   ----------------------------------
 45:     OP7
 46:     SCAN OPERATOR: 0x215c1e60
 47:     SIMPLE SCAN ON: /a/b
 48:     PROJECTION in 12
 49:     ----------------------------------
 50:     OP8
 51:     SCAN OPERATOR: 0x215c6b80
 52:     SIMPLE SCAN ON: /a/b/b2
 53:     PROJECTION in 7
 54: ----------------------------------
 55: OP9
 56: GROUP OPERATOR: 0x215c25f0
 57: PRIMARY in 28
 58: SECONDARY in 27
 59: LH Result in 26
 60: RH Result in 25
 61: ----------------------------------
 62: OP10
 63: SCAN OPERATOR: 0x215c22a0
 64: SIMPLE SCAN ON: /a/b
 65: PROJECTION in 26
 66: ----------------------------------
 67: OP11
 68: UNION ORDER OPERATOR
 69: PRIMARY in 25
 70: SECONDARY in 0
 71: LH PRIMARY in 24
 72: LH SECONDARY in 0
 73: RH PRIMARY in 22
 74: ----------------------------------
 75:   OP12
 76:   SCAN OPERATOR: 0x215ceae0
 77:   SIMPLE SCAN ON: /a/b/b1/b2/c/f/d
 78:   PROJECTION in 24
 79:   ----------------------------------
 80:   OP13
 81:   UNION ORDER OPERATOR
 82:   PRIMARY in 22
 83:   SECONDARY in 0
 84:   LH PRIMARY in 21
 85:   LH SECONDARY in 0
 86:   RH PRIMARY in 19
 87:   ----------------------------------
 88:     OP14
 89:     SCAN OPERATOR: 0x215ce2e0
 90:     SIMPLE SCAN ON: /a/b/b3/b4/c/f/d
 91:     PROJECTION in 21
 92:     ----------------------------------
 93:     OP15
 94:     UNION ORDER OPERATOR
 95:     PRIMARY in 19
 96:     SECONDARY in 0
 97:     LH PRIMARY in 17
 98:     LH SECONDARY in 0
 99:     RH PRIMARY in 18
100:     ----------------------------------
101:       OP16
102:       SCAN OPERATOR: 0x215ccd80
103:       SIMPLE SCAN ON: /a/b/c/f/d
104:       PROJECTION in 17
```

```
105:    ----------------------------------
106:        OP17
107:            SCAN OPERATOR: 0x215cd310
108:            SIMPLE SCAN ON: /a/b/b2/c/f/d
109:            PROJECTION in 18
110: ----------------------------------
111:    <d>dd2</d><d>dd21</d>
112: (1 row affected)
```

Some observations regarding the above plan are as follows. First, in OP11 to OP17 (commencing at line 67 above), the above plan performs ordered union of node ids that conform to the pattern /a/b//c/*/d. This implies that, for n such paths (n−1) union order operations will be generated in the plan and also n simple path scans. Such a dependence of plan size on number of paths (i.e., nature of data) is a source of stack overflows for queries on documents having a large number of distinct paths.

In OP3-OP5 (at lines 21-36) and in OP6-OP8 (at lines 38-53), the plan is performing predicate evaluation for /a/b[//b2]. Again, it should be noted that for each path satisfying the predicate pattern, three operators are generated. Finally OP1 (at lines 2-11) performs intersection on /a/b and returns secondary results from the RHS. The RHS secondary contains node id's for all the nodes satisfying pattern /a/b//c/*/d.

Among the main drawbacks of the design of prior art systems that cause such large plans are that the paths are generated from query trees at code generation time. As a result, descendants (//) and wildcards (*) are resolved at code generation time. In addition, only single path scans are supported.

The system and methodology of the present invention addresses these problems by providing additional infrastructure for normalization of XPath expressions before code generation. The present invention resolves descendants (//) and wildcards (*) before code generation so that the number of paths is known in advance. Once all such paths are known, the present invention makes it possible to introduce a single multi-path scan operator, thereby reducing plan sizes significantly. The normalization infrastructure provided by the present invention forms a layer between code generation and query parser. The input to the normalizer is a query tree and its output is a transformed query tree. In this layer, all the element nodes are first consolidated to form path patterns that contain descendants (//) and wildcards (*). Further using the path index, descendants (//) and wildcards (*) are resolved to get an exact number of paths. Once all the paths are known at code generation time, a multi-path scan operator that contains a vector of all paths can be created. As a result, more compact and efficient query plans can be created.

An example of a query plan generated by the present invention for the same example query described above is as follows:

```
1: ----------------------------------
2: INTERSECT OPERATOR: 0x3dc66020
3: Path is /a/b
4: INTERSECT MODE is RHSECONDARY
5: PRIMARY in 11
6: SECONDARY in 0
7: LH PRIMARY in 6
8: LH SECONDARY in 5
9: RH PRIMARY in 10
10: RH SECONDARY in 9
11: ----------------------------------
12:     GROUP OPERATOR: 0x3dc64be0
13:     PRIMARY in 6
14:     SECONDARY in 5
15:     LH Result in 4
16:     RH Result in 3
17:     ----------------------------------
18:         SCAN OPERATOR: 0x3dc64890
19:         SIMPLE SCAN ON: /a/b
20:         PROJECTION in 4
21:     ----------------------------------
22:         Multi Path SCAN OPERATOR: 0x3dc64e70
23:         SCAN OPERATION on
24:                 scanning path '/a/b/b1/b2'
25:                 scanning path '/a/b/b2'
26:                     PROJECTION in 3
27:     ----------------------------------
28:     GROUP OPERATOR: 0x3dc65f30
29:     PRIMARY in 10
30:     SECONDARY in 9
31:     LH Result in 8
32:     RH Result in 7
33:     ----------------------------------
34:         SCAN OPERATOR: 0x3dc64cd0
35:         SIMPLE SCAN ON: /a/b
36:         PROJECTION in 8
37:     ----------------------------------
38:         Multi Path SCAN OPERATOR: 0x3dc64fe0
39:         SCAN OPERATION on
40:                 scanning path'/a/b/b1/b2/c/f/d'
41:                 scanning path '/a/b/b2/c/f/d'
42:                 scanning path '/a/b/b3/b4/c/f/d'
43:                 scanning path '/a/b/c/f/d'
44:                     PROJECTION in 7
```

As illustrated by the above example, query plans generated with the present invention are more efficient since single operator can be used to scan multiple paths. Plan size (in terms of number of operators in a plan) becomes independent of size as well as structure of the document. In addition, the more compact plans generated by the present invention reduce the probability of stack overflows and other such problems. The system and methodology of the present invention makes the query engine to be a true path based query processor. After parse tree generation, the individual components of paths are consolidated and the remaining query compilation and query execution is based on paths. Thus the problem of impedance mismatch between input and output of code generator is addressed. Correct path scans are generated as the patterns are expanded using path indexes before code generation. Moreover, the present invention provides a cleaner implementation because of separate layers for processing trees and generating plans and is schema/DTD independent.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method implemented in a computer having at least a processor and memory for processing of path based queries requesting data from at least one markup language document, the method comprising:

parsing a path based query requesting data from at least one markup language document to generate a query tree corresponding to the path based query, wherein the path based query comprises a request to locate nodes of said at least one markup language document matching specified criteria;

before generating a query plan for obtaining data requested by the path based query, creating a transformed query tree to represent all paths which may be utilized for obtaining data requested by the path based query based on performing substeps of:

consolidating individual nodes of the query tree to form path fragments;

distributing outer path fragments on inner path fragments; and materializing all paths for obtaining data requested by the path based query;

representing all materialized paths using a multi-path operator, wherein said multi-path operator includes a vector of all materialized paths;

generating a query plan for obtaining data requested by the path based query based on the transformed query tree and multi-path operator; and executing said query plan to obtain and return the data requested by the path based query.

2. The method of claim 1, wherein said at least one markup language document comprises selected ones of a Hypertext Markup Language (HTML) document and an Extensible Markup Language (XML) document.

3. The method of claim 1, wherein said at least one markup language document is without a defined schema.

4. The method of claim 1, wherein access to data included in said at least one markup language document is path based.

5. The method of claim 4, wherein said substep of materializing all paths for obtaining data requested by the path based query includes materializing all physical paths in said at least one markup language document that satisfy the path based query.

6. The method of claim 1, wherein said at least one markup language document is stored in a database.

7. The method of claim 6, wherein said substep of materializing all paths includes expanding and validating paths which may be utilized for obtaining data against a path index of the database.

8. The method of claim 1, wherein said substep of materializing all paths further comprises:

removing consecutive descendant operators of a path expression.

9. The method of claim 1, wherein said substep of materializing all paths further comprises:

removing dot (.) operators of a path expression.

10. The method of claim 1, wherein said substep of materializing all paths further comprises:

resolving wildcard operators of a path expression.

11. The method of claim 1, wherein said substep of materializing all paths further comprises:

resolving descendant operators of a path expression.

12. The method of claim 1, wherein said step of generating a query plan includes generating physical operators containing appropriate paths for accessing data in said at least one markup language document based on the multi-path operator.

13. Processor-executable instructions stored on a computer-readable storage medium which, when executed by a processor, perform the method of claim 1.

14. A system for processing of path based queries requesting data from at least one markup language document, the system comprising: a computer having at least a processor and memory;

a parser module for generating a query tree based on a path based query requesting data from a markup language document, wherein the path based query comprises a request to locate nodes of said at least one markup language document matching specified criteria;

a normalization module for transforming the query tree module into a transformed query tree before generating a query plan for obtaining data requested by the path based query based on consolidating individual nodes of the query tree to form path fragments, distributing outer path fragments on inner path fragments and materializing all paths which may be utilized for obtaining data requested by the path based query from the at least one markup language document, wherein said normalization module creates a multi-path operator including a vector of all materialized paths;

an optimization module for generating a query plan for obtaining data requested by the path based query based on the transformed query tree and multi-path operator; and an execution module for executing the query plan to obtain and return the data requested by the path based query.

15. The system of claim 14, wherein the at least one markup language document comprises selected ones of a Hypertext Markup Language (HTML) document and an Extensible Markup Language (XML) document.

16. The system of claim 14, wherein the at least one markup language document is without a defined schema.

17. The system of claim 14, wherein access to data included in the at least one markup language document is path based.

18. The system of claim 14, wherein the normalization module materializes all physical paths in the at least one markup language document that satisfy the path based query.

19. The system of claim 14, wherein the at least one markup language document is stored in a database.

20. The system of claim 19, wherein the normalization module expands and validates paths which may be utilized for obtaining data requested by the path based query against a path index of the database.

21. The system of claim 14, wherein the normalization module removes consecutive descendant operators of a path expression in creating the transformed query tree.

22. The system of claim 14, wherein the normalization module removes dot (.) operators of a path expression in creating the transformed query tree.

23. The system of claim 14, wherein the normalization module resolves wildcard operators of a path expression in creating the transformed query tree.

24. The system of claim 14, wherein the normalization module resolves descendant operators of a path expression in creating the transformed query tree.

25. The system of claim 14, wherein the multi-path operator represents all materialized paths which may be utilized for obtaining data requested by the path based query from the at least one markup language document.

26. The system of claim 25, wherein the optimization module receives the transformed query tree as input and generates a query plan including physical operators for accessing data in the markup language document using the multi-path operator.

27. The system of claim 14, wherein the normalization module removes redundant paths in creating the transformed query tree.

28. In a database system implemented in a computer having at least a processor and memory, an improved method for processing path based queries in which access to the data maintained in a database is based on paths, the method comprising:

receiving a path based query requesting data from the database, wherein the path based query comprises a request to locate nodes of said at least one markup language document matching specified criteria;

before generating a query plan for processing a path based query, materializing all paths which may be utilized for obtaining data requested by the path based query, wherein materializing all paths includes consolidating individual nodes of the query tree to form path fragments and distributing outer path fragments on inner path fragments;

creating a multi-path operator to represent all materialized paths which may be utilized for obtaining data requested by the path based query, wherein said multi-path operator includes a vector of all materialized paths;

generating a query plan for obtaining data requested by the path based query from the database using the multi-path operator based, at least in part, on selecting paths to be utilized for obtaining the data from the materialized paths; and executing the query plan to obtain data from the database and return the data requested by the path based query.

29. The method of claim 28, wherein the data maintained in the database includes data from at least one markup language document.

30. The method of claim 29, wherein said at least one markup language document comprises selected ones of Hypertext Markup Language (HTML) documents and Extensible Markup Language (XML) documents.

31. The method of claim 28, wherein said materializing step includes expanding and validating paths which may be utilized for accessing data requested by the path based query against a path index of the database.

32. The method of claim 28, wherein said materializing step includes materializing all physical paths in a markup language document stored in the database for obtaining data requested by the path based query.

33. The method of claim 28, wherein said materializing step includes receiving a query tree representation of the path based query and consolidating individual nodes of the query tree representation to form path fragments.

34. The method of claim 28, wherein said step of generating a query plan includes generating physical operators containing appropriate paths for accessing data based on the multi-path operator.

35. Processor-executable instructions stored on a computer-readable storage medium which, when executed by a processor, perform the method of claim 28.

* * * * *